United States Patent [19]
Cheng

[11] Patent Number: 5,580,034
[45] Date of Patent: Dec. 3, 1996

[54] SHOCK ABSORBING OIL CYLINDER FOR A BICYCLE

[75] Inventor: Paul Cheng, Tainan, Taiwan

[73] Assignee: Taiwan Hodaka Industrial Co., Ltd., Tainan Hsien, Taiwan

[21] Appl. No.: 510,112

[22] Filed: Aug. 1, 1995

[51] Int. Cl.⁶ .................................................. B60G 13/00
[52] U.S. Cl. ................ 267/221; 188/322.17; 188/322.19
[58] Field of Search ............................ 267/221, 34, 175, 267/177, 286; 188/317, 322.17, 322.19, 322.21; 280/6.11, 696, 693, 724

[56] References Cited

U.S. PATENT DOCUMENTS

| | | | |
|---|---|---|---|
| 4,071,057 | 1/1978 | Nagase | 188/322.17 X |
| 4,744,444 | 5/1988 | Gillingham | 267/221 X |
| 4,830,395 | 5/1989 | Foley | 267/177 X |

Primary Examiner—Lee W. Young
Attorney, Agent, or Firm—Pro-Techtor International

[57] ABSTRACT

A shock absorbing oil cylinder has a main body, a seal ring, a shaft cover, and a shaft. The main body has a circular recess thereon and a cover seat on its top. An adjustable seat ring is passed through the main body beneath the cover seat. A seal ring is in the cover seat. The outer rim of the seal ring is covered by a glued rubber. An oil inlet is in the center of the seal ring. A soft pad is in the seal ring. A leak prevention ring is on the oil inlet. A bolt is inserted into the soft pad. A shaft cover covers the cover seat. A shaft is in the main body and is inserted in a piston. The damper rings are disposed on the piston and beneath the piston. A shaft ring is inserted in the valve seat. A retaining ring is inserted in the circular recess. The cushion ring is beneath the main body. A spring is located between the adjustable seat ring and the shaft seat ring.

3 Claims, 6 Drawing Sheets

SHOCK ABSORBING OIL CYLINDER FOR A BICYCLE

BACKGROUND OF THE INVENTION

The invention relates to an oil cylinder for a bicycle. More particularly, the invention relates to a shock absorbing oil cylinder which can avoid the mixing of oil and air.

A conventional oil cylinder for a bicycle cannot be filled by oil fully. Thus the oil and air will be mixed in the oil cylinder. The viscosity of the oil is decreased and the velocity of the oil is varied.

SUMMARY OF THE INVENTION

An object of the invention is to provide a shock absorbing oil cylinder for a bicycle which can be filled by the oil fully so that the oil will not be mixed with the air.

Accordingly, a shock absorbing oil cylinder has a main body, a seal ring, a shaft cover, and a shaft. The main body which has threads on its outer periphery has a circular recess on the inner lower periphery of the main body and a cover seat on the upper portion of the main body. The bore of the cover seat is larger than that of the main body. Am adjustable seat ring is passed through the main body beneath the cover seat. A seal ring which has a diameter the same as that of the main body is disposed in the cover seat. A chamber is formed in the cover seat. The outer rim of the seal ring is covered by a glued rubber. The outer rim of the seal ring has a circular groove to receive the glued rubber. An oil inlet is disposed in the center of the seal ring. A hollow soft pad is disposed in the seal ring to cover the oil inlet. A leak prevention ring is disposed on the oil inlet. A bolt is inserted into the soft pad to screw the oil inlet tightly. A shaft cover which has a hollow interior to receive the top portion of the bolt and a top covering the cover seat. A shaft which is disposed in the main body is inserted through a cushion ring, a hollow valve seat and a buffer ring. The top portion of the shaft is inserted in a hollow piston in order to position the piston. The piston has a plurality of oil passages therein. The outer periphery of the piston is surrounded by an abrasion-proof ring. A plurality of damper rings are disposed on the piston and between the buffer ring and the piston. The outer periphery of the valve seat are surrounded by at least an oil ring. A shaft ring is inserted in the hollow interior of the valve seat. A retaining ring is inserted in the circular recess of the main body to restrict and position the valve seat. The cushion ring is disposed beneath the main body. The lower portion of the shaft is disposed outside the main body. A shaft seat ring and a shaft seat are inserted by the lower portion of the shaft. A spring which surrounds the main body is located between the adjustable seat ring and the shaft seat ring.

DETAILED DESCRIPTION OF THE INVENTION

Figure 1:
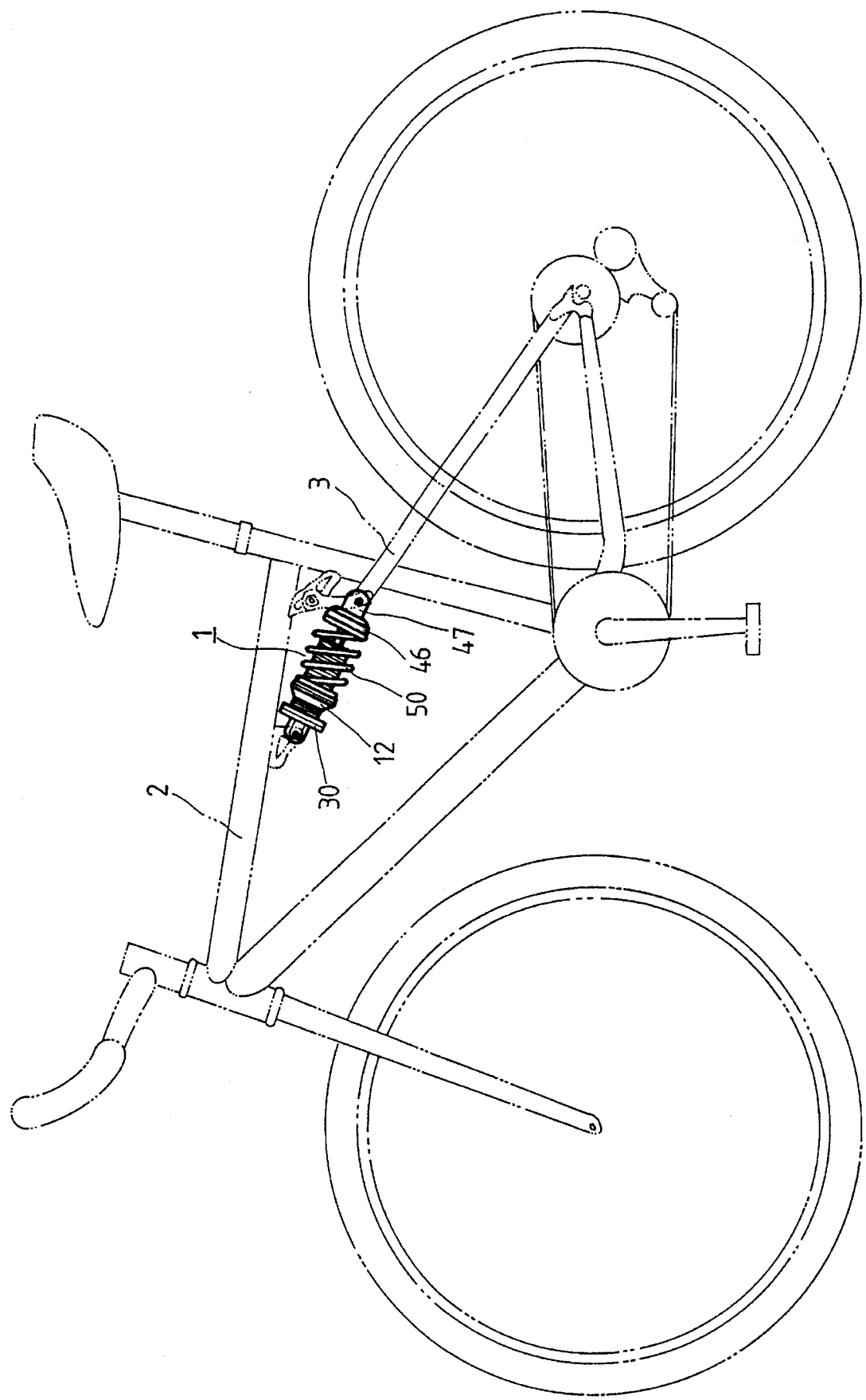
FIG. 1 is a plan view of a shock absorbing oil cylinder mounted on a bicycle in accordance with the invention.
Figure 2:
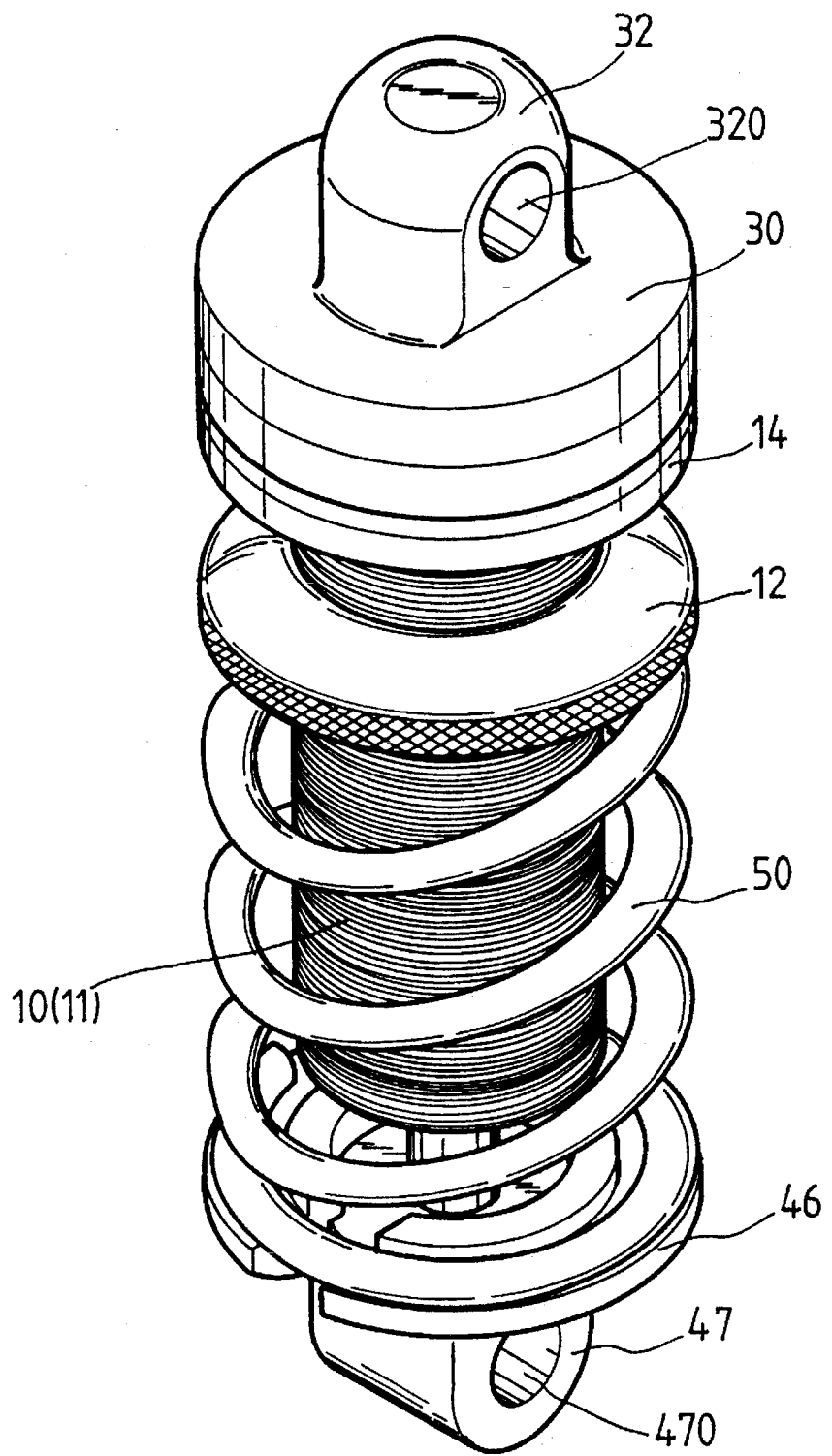
FIG. 2 is a perspective assembly view of a shock absorbing oil cylinder in accordance with the invention.
Figure 3:
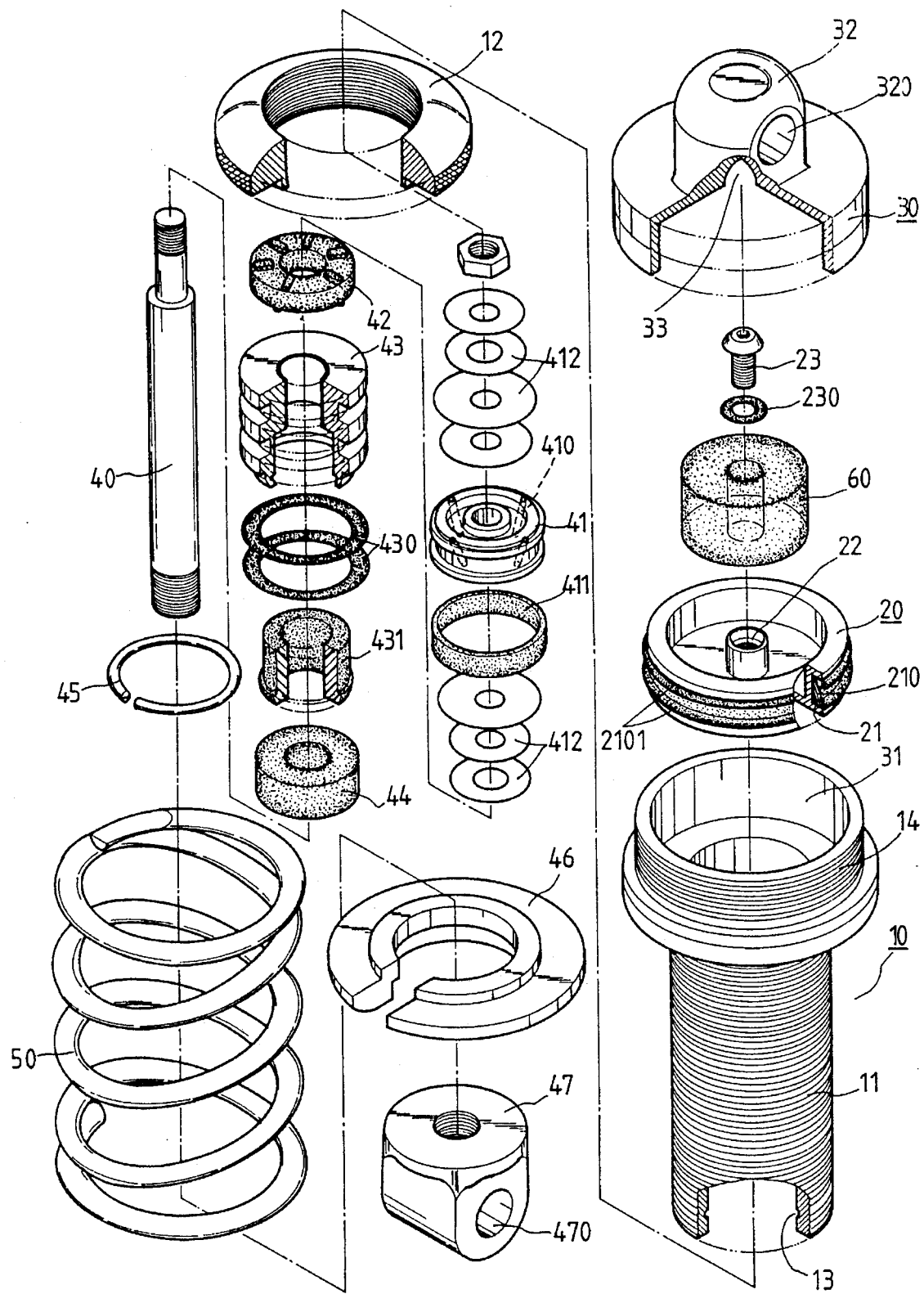
FIG. 3 is a perspective exploded view of FIG. 2.
Figure 4:
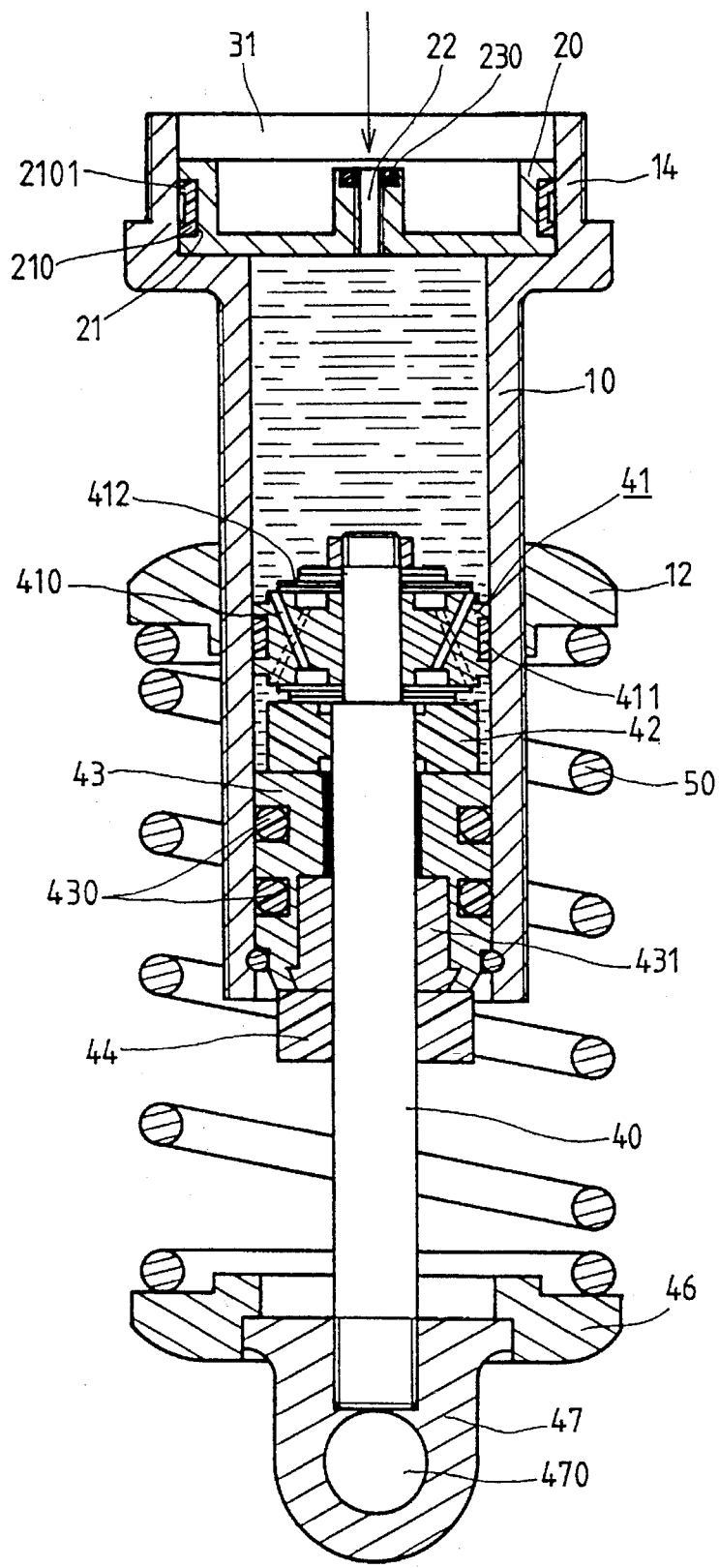
FIG. 4 illustrates a schematic view of filling the oil into a shock absorbing cylinder.
Figure 5:
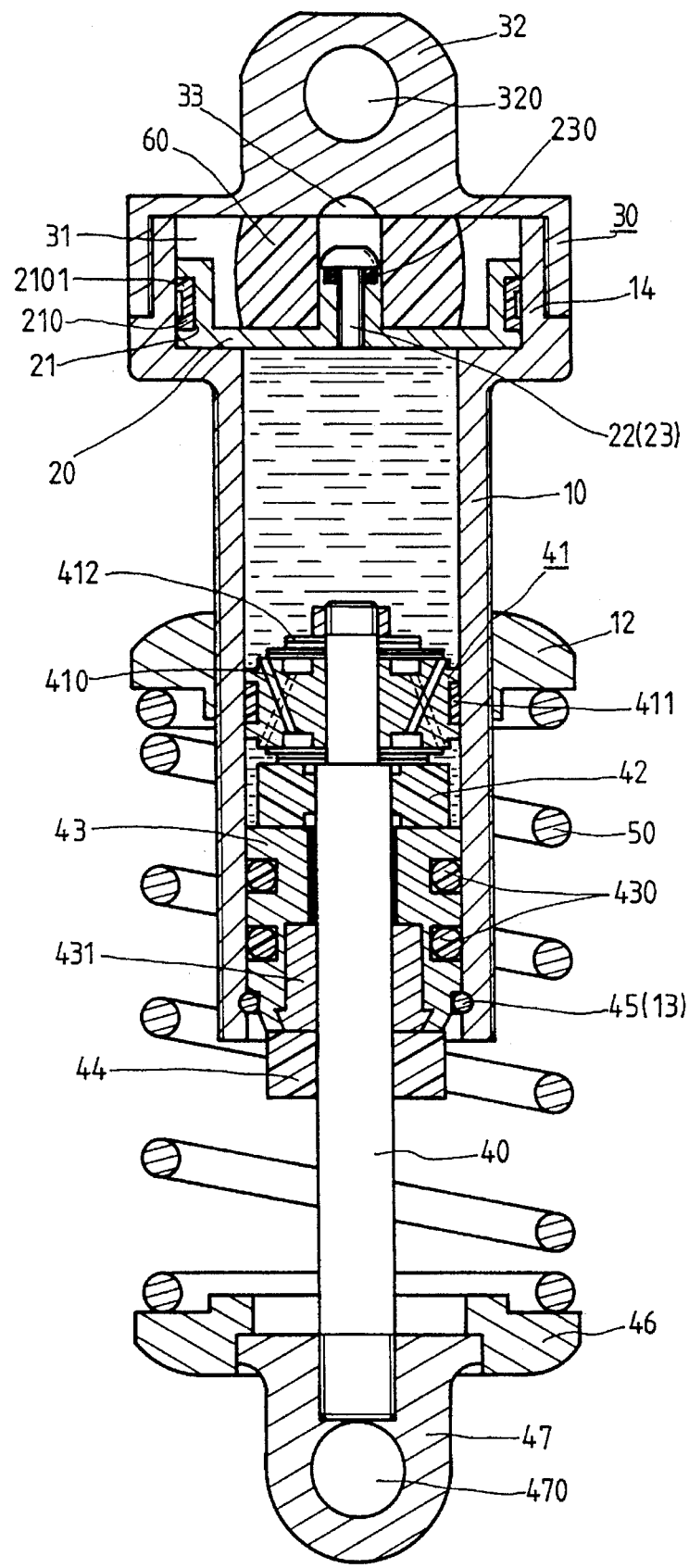
FIG. 5 is a cross-sectional view of FIG. 2.
Figure 6:
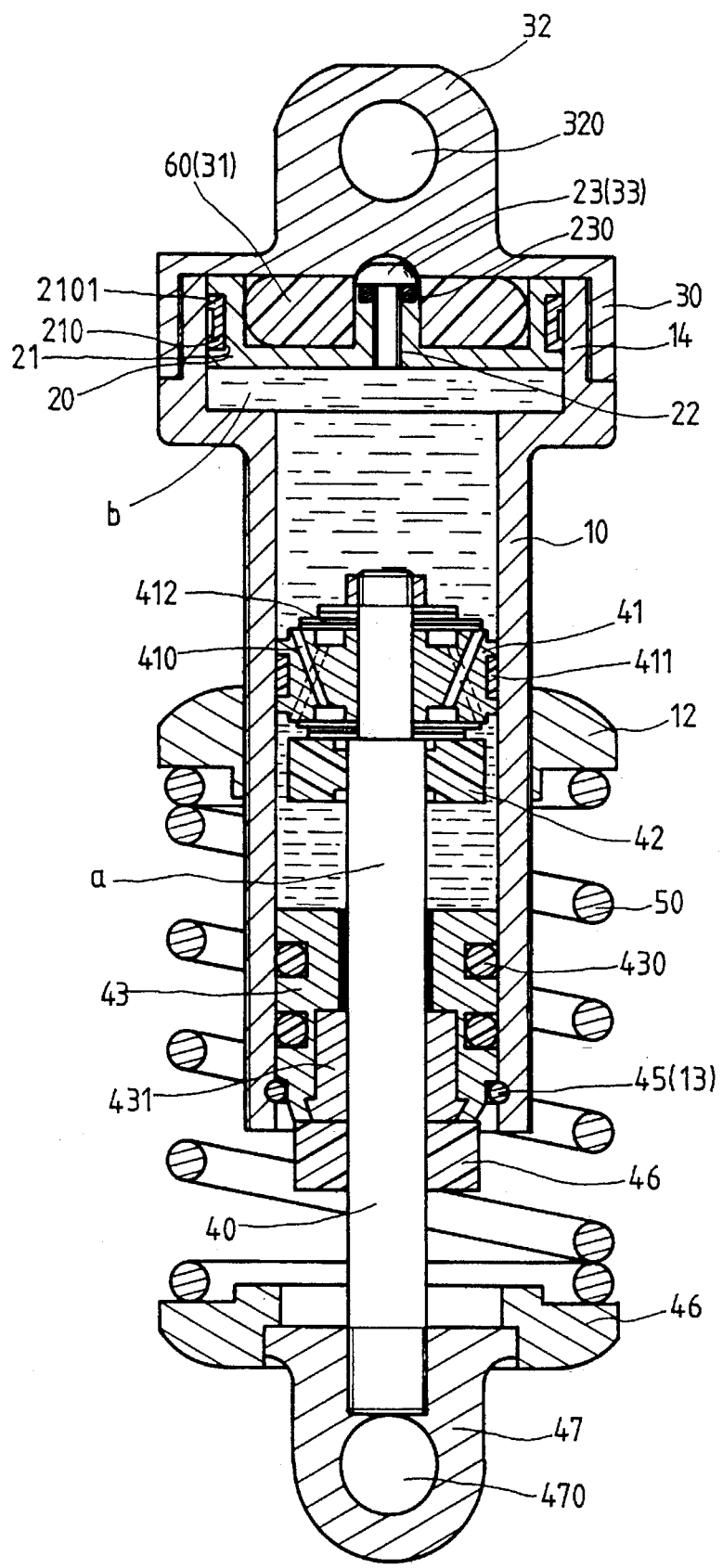
FIG. 6 illustrates a schematic view of a shock absorbing oil cylinder in operation.

Referring to FIG. 1, a shock absorbing oil cylinder 1 is disposed between one end of the rear stay 3 and the central portion of a cross bar 2. The shock which is produced by the rear wheel can be reduced significantly by the oil cylinder 1.

Referring to FIGS. 2 to 6, the oil cylinder 1 has a hollow main body 10, a seal ring 20, a shaft cover 30, a shaft 40 and a plurality of rings which will be described later. The main body 10 which has threads 11 on its outer periphery has a circular recess 13 on the inner lower periphery of the main body 10 and a cover seat 14 on the upper portion of the main body 10. The bore of the cover seat 14 is larger than that of the main body 10. An adjustable seat ring 12 is passed through the main body 10 beneath the cover seat 14, A seal ring 20 which has a diameter the same as that of the main body 10 is disposed in the cover seat 14. A chamber 14 is formed in the cover seat 14. The outer rim of the seal ring 20 is covered by a glued rubber 210 which has two protruded portions 2101. The outer rim of the seal ring 20 has a circular groove 21 to receive the glued rubber 210. An oil inlet 22 is disposed in the center of the seal ring 20. A hollow soft pad 60 is disposed in the seal ring 20 to cover the oil inlet 22. A leak prevention ring 230 is disposed on the oil inlet 22. A bolt 23 is inserted into the soft pad 60 to screw the oil inlet 22 tightly. A shaft cover 30 which has a hollow interior 33 to receive the top portion of the bolt 23 and a top 32 with a through hole 320 on the side periphery of the top 32 covering the cover seat 14. A shaft 40 which is disposed in the main body 10 is inserted through a cushion ring 44, a hollow valve seat 43 and a buffer ring 42. The top portion of the shaft 40 is inserted in a hollow piston 41 in order to position the piston 41. The piston 41 has four oil passages 410 therein. The outer periphery of the piston 41 is surrounded by an abrasion-proof ring 411. A plurality of damper rings 412 are disposed on the piston 41 and between the buffer ring 42 and the piston 41. The outer periphery of the valve seat 43 are surrounded by two oil rings 430. A shaft ring 431 is inserted in the hollow interior of the valve seat 43. A retaining ring 45 is inserted in the circular recess 13 of the main body in order to restrict and position the valve seat 43. The cushion ring 44 is disposed beneath the main body 10. The lower portion of the shaft 40 is disposed outside the main body 10. A shaft seat ring 46 and a shaft seat 47 are inserted by the lower portion of the shaft 40. The shaft seat 47 has a through hole 470 to receive one end of the rear stay 3. A spring 50 which surrounds the main body 10 is located between the adjustable seat ring 12 and the shaft seat ring 46.

The oil inlet 22 communicates with the interior of the main body 10. The oil inlet 22 can be sealed by the bolt 23 and the leak prevention ring 230. The soft pad 60 which is made of polyurethane can be compressed to buffer the pressure produced by the rear wheel. The position of the adjustable seat ring 12 can be adjusted to change the compression state of the spring 50.

The invention is not limited to the above embodiment but various modification thereof may be made. It will be understood by those skilled in the art that various changes in form and detail may be made without departing from the spirit and scope of the invention.

I claim:

1. A shock absorbing oil cylinder comprising:
   a main body which has a plurality of threads on an outer periphery of said main body having a circular recess on an inner lower periphery of said main body and a cover seat on an upper portion of said main body;

the bore of said cover seat being larger than that of a main portion of said main body;

an adjustable seat ring positioned around said main body beneath said cover seat;

a seal ring which has a diameter the same as that of said main body disposed in said cover seat;

a chamber formed in said cover seat;

an outer rim of said seal ring covered by a glued rubber;

an outer rim of said seal ring having a circular groove to receive said glued rubber;

an oil inlet disposed in a center of said seal ring;

a hollow soft pad disposed in said seal ring to cover said oil inlet;

a leak prevention ring disposed on said oil inlet;

a bolt inserted into said oil inlet;

a shaft cover which has a top and a hollow interior to receive a top portion of said cover seat;

a shaft which is disposed in said main body inserting through a cushion ring, a hollow valve seat and a buffer ring;

a top portion of said shaft being inserted into a hollow piston to position said piston;

said piston having a plurality of oil passages therein;

an outer periphery of said piston surrounded by an abrasion-proof ring;

a plurality of damper rings disposed on said piston and between said buffer ring and said piston;

an outer periphery of said valve seat surrounded by at least an oil ring;

a shaft ring inserted in a hollow interior of said valve seat;

a retaining ring inserted in said circular recess of said main body to restrict and position said valve seat;

the cushion ring disposed beneath said main body;

a lower portion of said shaft disposed outside said main body;

a shaft seat ring and a shaft seat inserted at the lower portion of said shaft;

a spring which surrounds said main body located between said adjustable seat ring and said shaft seat ring.

2. A shock absorbing oil cylinder as claimed in claim 1, wherein said shaft cover has a through hole adapted to receive a protrusion beneath a cross bar.

3. A shock absorbing oil cylinder as claimed in claim 1, wherein said shaft seat has a through hole adapted to receive an end of a rear stay.

* * * * *